US006902011B2

(12) United States Patent
Hall

(10) Patent No.: US 6,902,011 B2
(45) Date of Patent: Jun. 7, 2005

(54) VARIABLE TORQUE IMPACT WRENCH

(75) Inventor: Jefferson Hall, Concord, NH (US)

(73) Assignee: FCI Americas Technology, Inc., Reno, NV (US)

(*) Notice: Subject to any disclaimer, the term of this patent is extended or adjusted under 35 U.S.C. 154(b) by 0 days.

(21) Appl. No.: 10/445,071

(22) Filed: May 23, 2003

(65) Prior Publication Data

US 2004/0231868 A1 Nov. 25, 2004

(51) Int. Cl.[7] .................................................. B23B 45/04
(52) U.S. Cl. ........................ 173/169; 173/168; 173/170
(58) Field of Search .......................... 173/47, 168, 169, 173/170, 177, 218, 219, 221; 81/470; 91/428; 251/84; 137/270, 625.69

(56) References Cited

U.S. PATENT DOCUMENTS 3,105,416 A * 10/1963 Van Hecke .................. 91/335
3,326,240 A * 6/1967 McConnaughay ........ 137/637.4
3,718,313 A 2/1973 Miller ......................... 251/290
3,983,947 A 10/1976 Wills et al. ................. 173/169
3,989,113 A * 11/1976 Spring et al. ............... 173/221
4,316,512 A 2/1982 Kibblewhite et al. ......... 173/12
4,366,673 A * 1/1983 Lapp ........................... 60/477
4,379,492 A 4/1983 Hiraoka ........................ 173/12
4,418,764 A * 12/1983 Mizobe ...................... 173/177
4,476,942 A 10/1984 Elkin ......................... 173/169
4,522,269 A 6/1985 Adman et al. ................ 173/12
4,548,229 A * 10/1985 Johnson ...................... 137/270
4,823,057 A 4/1989 Eley ........................... 318/432
4,887,499 A 12/1989 Kipfelsberger ............... 81/470
5,061,160 A * 10/1991 Kinder et al. .............. 418/61.3
5,113,949 A 5/1992 Ohkubo et al. ............. 173/177
5,293,747 A 3/1994 Geiger ........................ 60/493
5,377,769 A * 1/1995 Hasuo et al. ............... 173/169
5,442,992 A 8/1995 Sanner et al. ................ 91/428
5,924,536 A 7/1999 Frenken ...................... 192/56.1
6,062,323 A 5/2000 Pusateri et al. ............. 173/169
6,250,399 B1 6/2001 Giardino ...................... 173/47
6,311,786 B1 11/2001 Giardino et al. ............... 173/1
6,334,494 B1 1/2002 Nagato ...................... 173/93.5
6,354,176 B1 3/2002 Nordlin ..................... 81/124.4

OTHER PUBLICATIONS

Racine Hydraulic Tools—Product Catalog, 4 pages.
Fairmont—Product Catalog, 2 pages.

* cited by examiner

*Primary Examiner*—Louis K. Huynh
*Assistant Examiner*—Nathaniel Chukwurah
(74) *Attorney, Agent, or Firm*—Harrington & Smith, LLP

(57) ABSTRACT

Disclosed herein is a fluid control system for varying the power available to a fluid powered tool, a hydraulically driven impact wrench. The system disclosed herein varies power available to the tool by use of a bypass mechanism that is downstream of a directional control valve spool. Among other things, the advantageous placement of the bypass valve limits the thermal burden in the hydraulic circuit.

17 Claims, 14 Drawing Sheets

VARIABLE TORQUE IMPACT WRENCH

TECHNICAL FIELD OF THE INVENTION

This invention relates to improved controls for varying the output power of a liquid driven tool such as a torque wrench.

BRIEF DESCRIPTION OF PRIOR DEVELOPMENTS

Certain construction and/or maintenance activities call for powered tools having great output. Hydraulic systems provide certain advantages for powering such tools and are commonly used in some industries.

Consider one task required of utility linemen, that of assembling utility poles, and the equipment thereon. This is typically completed with the pole in an erect position, and by a lineman elevated by a bucket truck. Due to limited space and production demands, versatile tooling that can quickly complete a few tasks is required. For example, the linemen must drill through a utility pole, and preferably without considerable exertion. Experience has shown that hydraulic impact wrenches are a preferred tool for this task. Once drilling has been completed, installation of hardware is typically undertaken. For the sake of convenience, linemen will frequently use the hydraulic impact wrench for hardware installation. However, the impact wrenches have enough power that damage to the installation hardware, and/or utility pole is a frequent result.

One example of a hydraulic impact wrench is the HIW-716 produced by FCI USA, Inc. of Etters, Pa. Another example is the H8508 Impact Wrench and Drill produced by Greelee of Fairmont, Minn.

Therefore, what is needed are method and apparatus for adjusting the output of a hydraulic tool, such as an impact wrench.

SUMMARY OF THE INVENTION

The foregoing and other problems are overcome by methods and apparatus in accordance with embodiments of this invention.

Disclosed herein is an adjustable torque wrench, which allows a user to select proper power and torque for different job applications. In preferred embodiments, torque is controlled by a knob for user adjustment. The knob provides for easy access, even with line-mans' gloves on, and further minimizes the potential for breakage. The system disclosed herein provides for use in open or closed center type hydraulic systems, and further allows the user to quickly change from open to closed center circuits.

In the preferred embodiments disclosed herein, the outstanding torque of typical hydraulic wrenches is available to an operator, while torque reductions of up to about 50% may be realized. The preferred embodiments therefore provide a system that is both outstanding for drilling, as well as for hardware installation, providing for a drastically decreased risk of snapping off bolts and adaptors.

The variable torque impact wrench adjusts torque by dumping the flow of oil back to the supply without restricting flow, therefore avoiding heat build up and allowing the wrench to perform in multiple work settings. In preferred embodiments, the variable torque impact wrench is capable of providing more than 400 ft-lbs of torque, and enables the operator to quickly adjust the torque setting needed. Adjusting torque accommodates multiple functions, such as drilling robust materials or fastening hardware. In preferred embodiments, the knob is located so as to afford easy access, while remaining protected. One example is where the knob is located underneath the motor on the back of the handle.

In preferred embodiments, the variable torque impact wrench utilizes a gerotor drive motor, which provides very high and controlled horsepower with less vibration. The performance of the gerotor motor results in reduced wear to tool components, reduced damage to driven items, and smoother operation for the user.

Therefore, it is considered that the embodiments provided herein are illustrative only, and are not to be considered limiting of the invention.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Disclosed herein are methods and apparatus for providing a fluid control system for a fluid operated tool, wherein the fluid control system provides for variable limitation of power output to the unit performing work. The fluid control system provides multiple flow paths to provide for, among other things, selectable diversion of a portion of flow to a work unit, and reversing the direction of the work unit. Although the work unit is disclosed herein as a gerotor motor (in the preferred embodiment, as a part of a hydraulically driven variable torque impact wrench), it is recognized that the fluid control system may be used with other types of work units contained within other fluid operated tools. These other tools may employ gerotor motors, or other apparatus adapted for fluid drive, such as a gear motor. Examples of other tools include, without limitation: wrenches, grinders, and drills. Therefore, the teachings herein are not limited to a hydraulically driven variable torque impact wrench comprising a gerotor motor. Rather, these teachings are considered to be only illustrative and non-limiting of the invention.

The teachings herein disclose a fluid control system that, in the preferred embodiments, limits the power available to the gerotor motor, thereby reducing output torque. The reduction in power is achieved by returning a portion of the total flow of powering fluid (i.e., hydraulic oil, or "oil" as used herein) to the fluid supply system. Returning a portion of the total flow is achieved by use of a bypass mechanism, or spool. In preferred embodiments, the bypass spool is located up stream of the motor intake.

The flow of oil passes through an orifice where the effective cross sectional area of the orifice can be varied by the operator. In preferred embodiments, the cross sectional area is varied by rotation of the bypass spool. The size of the exposed cross sectional area of the orifice can be altered from zero unit area (no bypass, providing full power) to a size that yields an appreciable loss of power available to the motor. In preferred embodiments, the appreciable loss is as high as fifty percent of full power. However, the orifice may be designed for power loss reaching up to as high as full power (100%).

One of the novel features of this invention is the location of the bypass valve. The valve is preferably located between a main directional control valve and the motor. One advantage of placing the bypass valve in this location is that heat is only created when high pressure oil travels to the motor; therefore heat is not generated while the tool is idle. Since the tool is operated in short time intervals relative to its idle state, the amount of heat generated in the hydraulic circuit is minimal in comparison with other systems.

Figure 1:
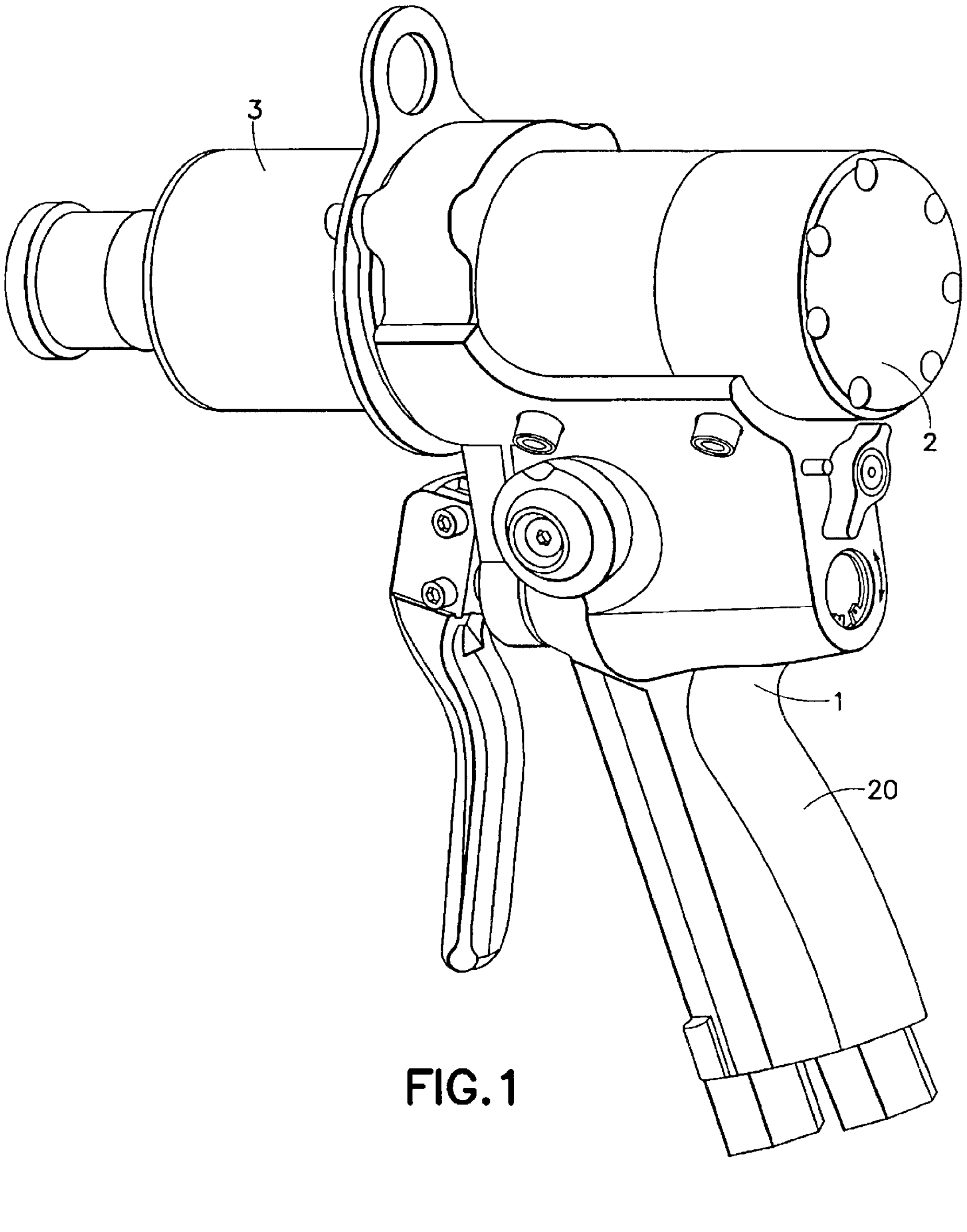
FIG. 1 is an illustration of a torque wrench that incorporates the fluid control system disclosed herein.

Referring to FIG. 1, there is shown an illustration of a hydraulically driven variable torque impact wrench, or tool, as also referred to herein. The tool includes a handle 20 having an internal fluid control system 1, a motor 2, and an impact mechanism 3. The fluid control system 1 may be disposed in other components of a tool. However, in the embodiment disclosed herein, the fluid control system 1 is disposed within the handle 20. The tool preferably makes use of a gerotor motor 2 and an impact mechanism 3, but the invention could be used with any type of fluid operated motor including a gear motor.

Figure 2:
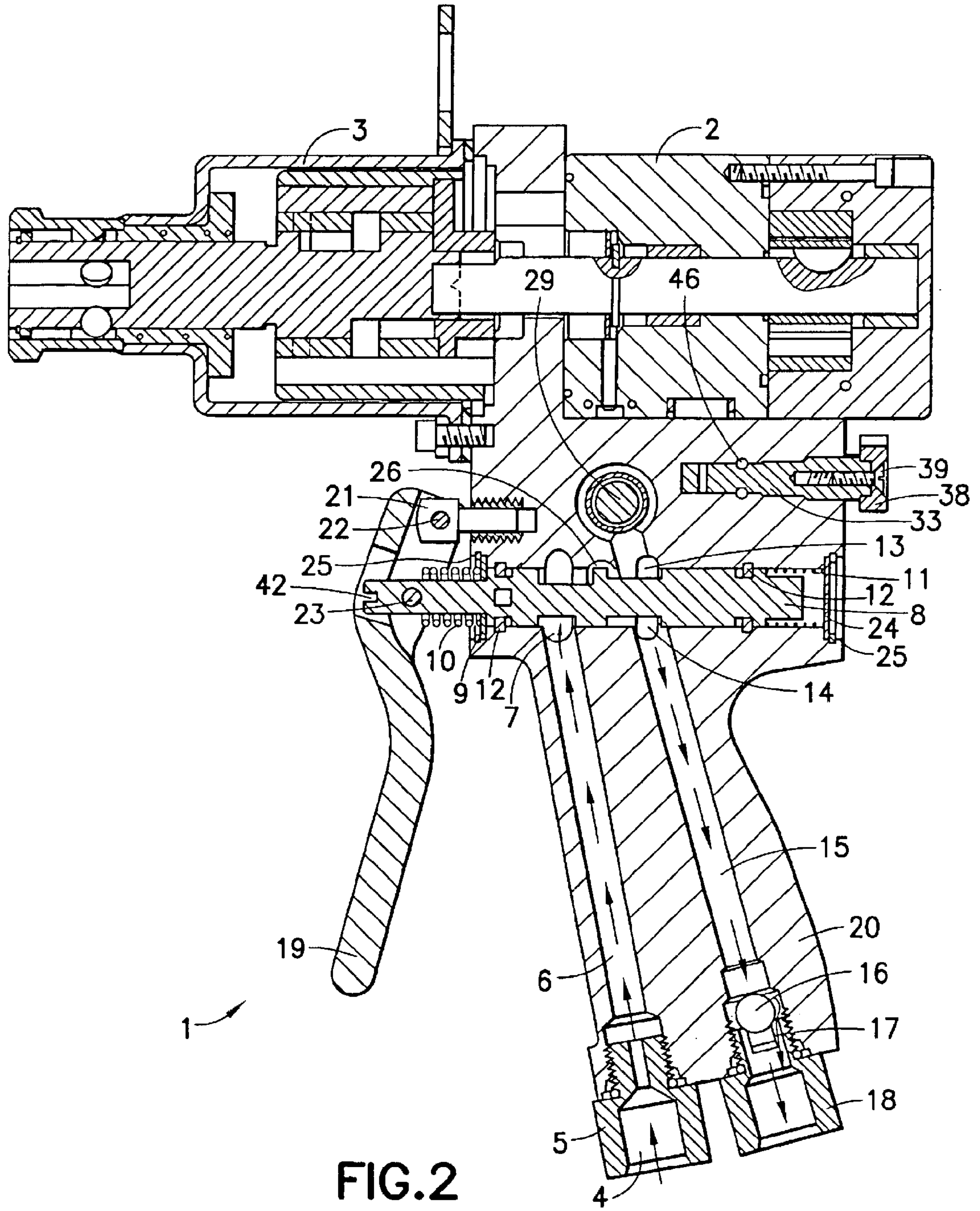
FIG. 2 is a cross sectional view from the side of the torque wrench shown in FIG. 1.

Referring to FIG. 2, aspects of the fluid control system 1 are shown. In operation, oil from a supply (not shown) enters the tool through the inlet port 4 disposed in the coupler 5. The oil then flows through port 6 into the directional control valve cavity 7. A directional control valve spool 8 traverses the directional control valve cavity 7. In the idle state, the directional control valve spool 8 is pressed against the spool washer 9. The idle position of the spool 8 is biased against the spool washer 9 by at least one spring, preferably included as springs 10 and 11. Oil is prevented from leaking from the tool by seals 12. In the idle state, the oil has a direct return path to the supply tank (not shown) through the cavity 13 surrounding the spool 8. In the idle state, the oil passes from the cavity 13, enters the return cavity 14 and then enters into the return port 15. The oil passes preferably by a check ball 16, into a slot 17 in the coupler 18 and returns to the supply tank. This embodiment of a flow path for the fluid control system 1 satisfies the requirements for open-center hydraulic circuits where oil continuously flows through the tool.

Although referred to as a "spool" in the preferred embodiment disclosed herein, the direction control valve bypass spool 8 may be any component, such as, in non-limiting embodiments, a valve, that otherwise provides for the functions described herein. Similarly, other "spools" disclosed herein may be suitably replaced by other components, such as other types of valves.

Figure 12:
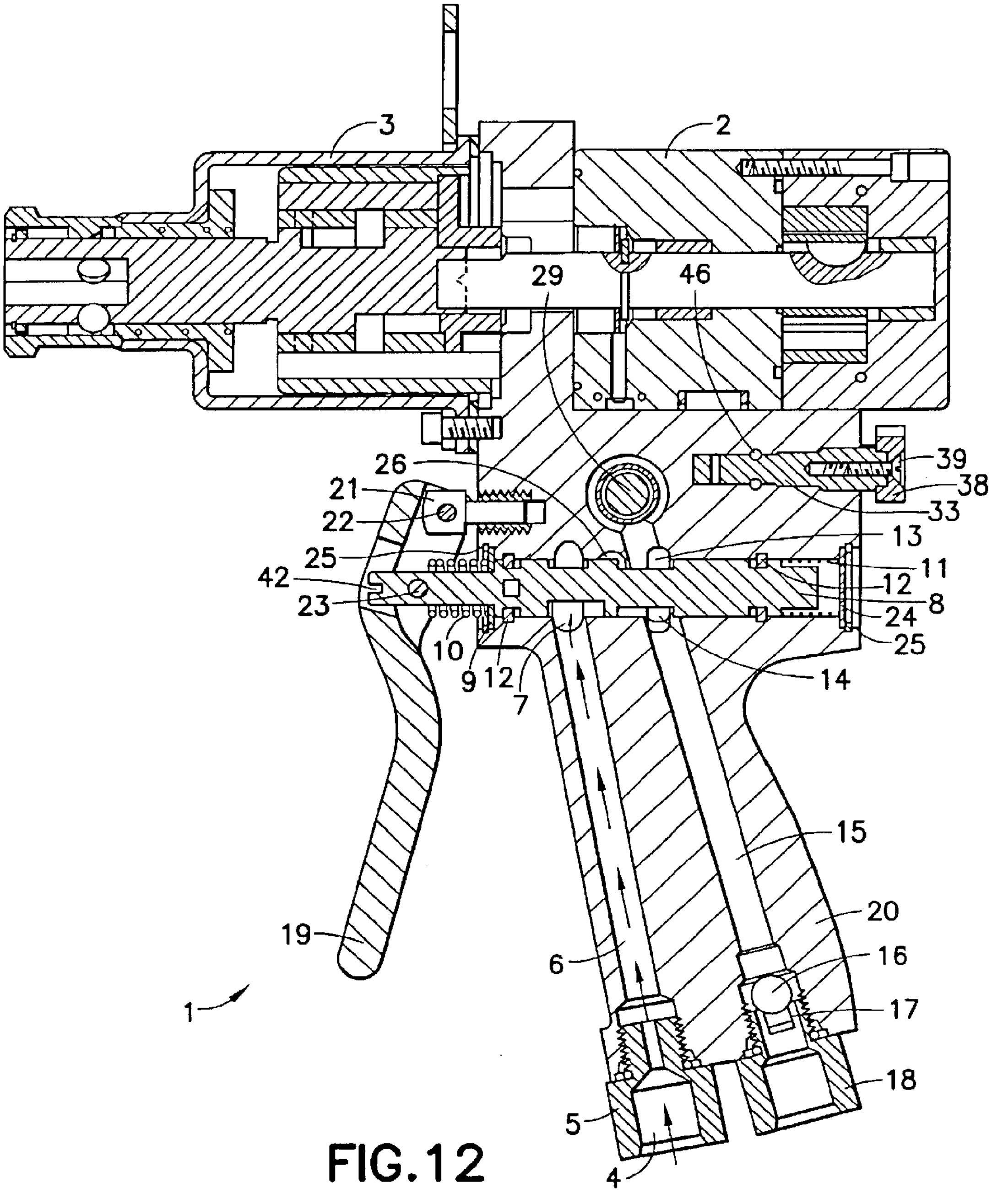
FIG. 12 depicts closed center operation of the fluid control system.

In another embodiment, shown in FIG. 12, the fluid control system 1 provides for a closed-center flow path. In this embodiment, the fluid control system 1 impedes flow when the tool is in the idle state. Referring to FIG. 12, the operator rotates the control valve spool 8 180 degrees on its' axis using the screw driver slot 42. Oil enters the tool through port 4 in the coupler 5. The oil then passes through port 6 in the directional control valve cavity 7. In the idle state, the directional control valve spool 8 sits pressed against the spool washer 9, as shown also in FIG. 2. The control valve spool 8 is biased in this position by at least one spring, preferably included as springs 10 and 11. Oil is prevented from leaking from the tool by seals 12. Note that in FIG. 12, the directional control valve spool 8 is shown as inverted from the configuration shown in FIG. 2. In the inverted configuration shown in FIG. 12, a seal between the directional control spool 8 and the handle 20 prevents the oil from flowing into cavity 13. As a result, the flow of oil is essentially "choked." In this manner, the fluid control circuit 1 may be configured for closed-center operation. In the preferred embodiment, as otherwise presented herein, the fluid control system 1 is configured for open-center operation.

Figure 3:
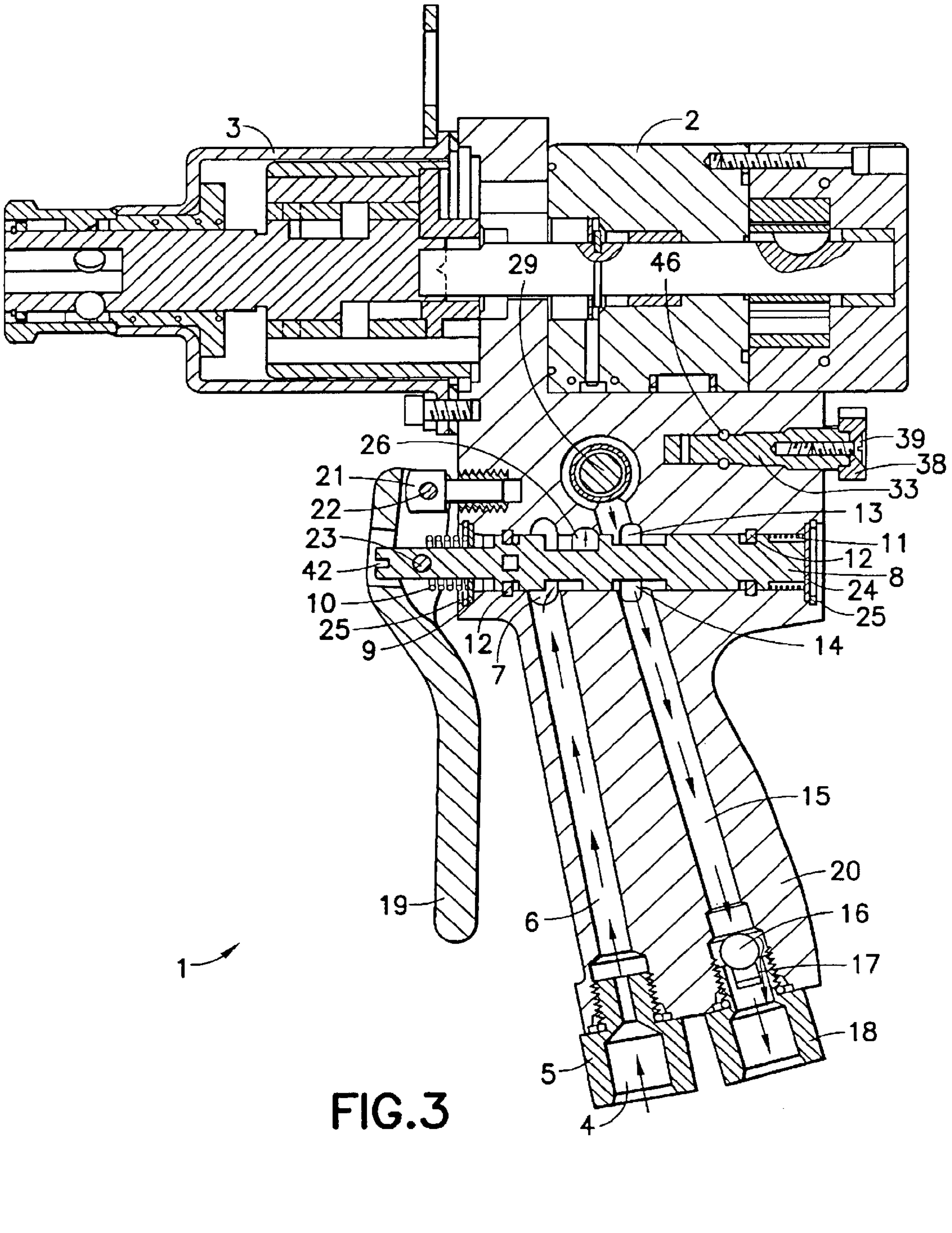
FIG. 3 is a cross sectional view as in FIG. 2 with the trigger depressed.

Referring to FIG. 3, when work is desired, the operator depresses the trigger 19. The trigger 19 mounts pivotally on a mounting screw 21 and is secured with a pin 22. The mounting screw 21 is preferably attached to the handle 20. The trigger 19 is preferably attached to the directional control spool 8 with another pin 23. The trigger 19 rotates around the pin 22 applying linear motion to the spool 8 until the spool 8 contacts the rear spool washer 24. The rear spool washer 24 and the front spool washer 9 are held in place by retaining rings 25.

Movement of the spool 8 closes the cavity 13. The closing of cavity 13 forces the oil to travel into port 26. Port 26 enters the main motor reversing directional control cavity 27, shown in FIG. 4. The main motor reversing directional control cavity 27 is used for controlling the direction of the flow to the motor 2. The motor reverse spool 29 is sealed from the atmosphere by O-rings 47. The motor reverse spool 29 is preferably restrained in place by knobs 45 on both sides of the spool 29. The knobs 45 are fastened to the spool 29 by screws 46. Once in the cavity 27, the oil is forced into adjacent cavity 28 by the motor reverse spool 29. The motor reverse spool 29 provides features that direct the oil to then enter port 30.

Figure 4:
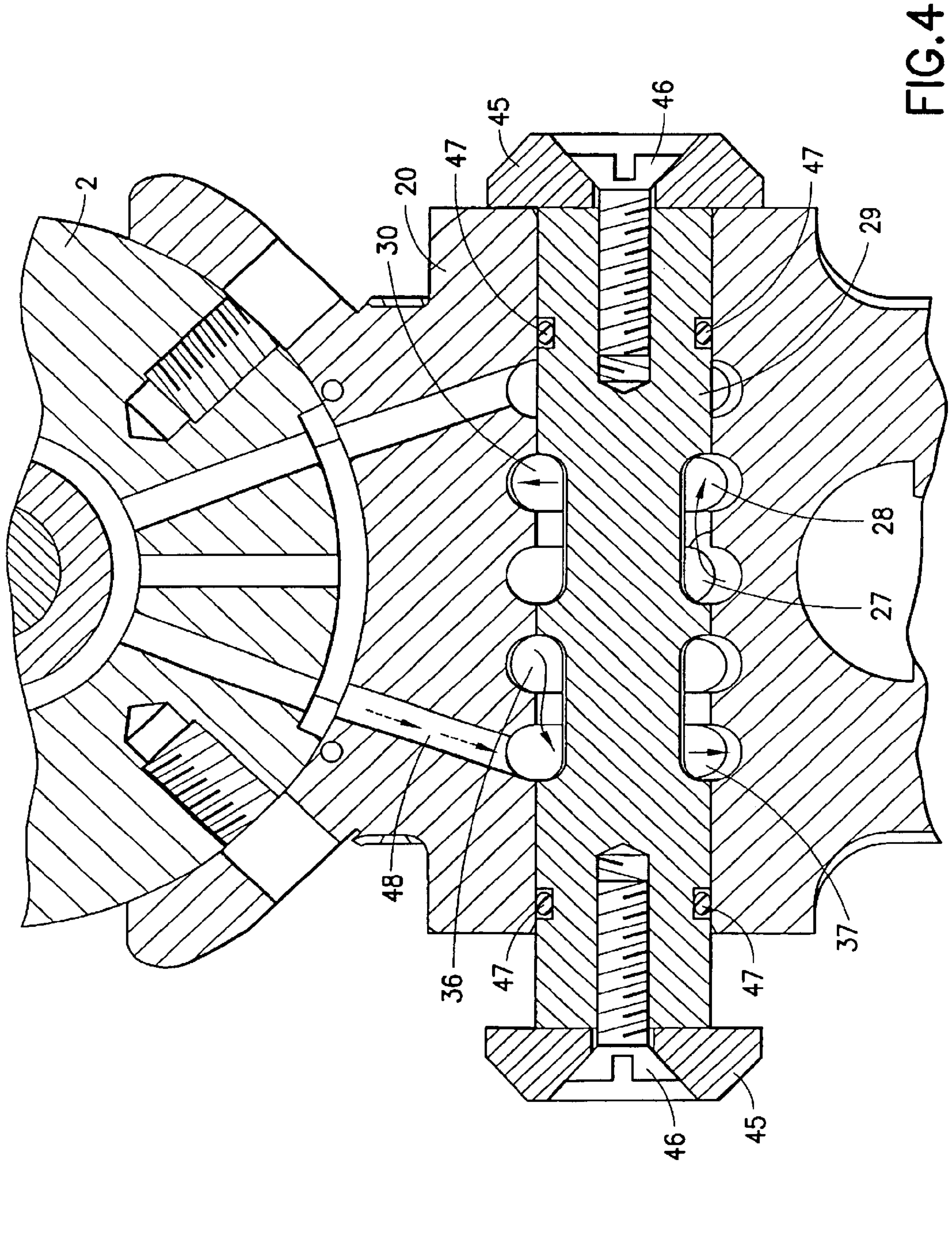
FIG. 4 is a partial cross sectional view from the front of the motor reversing valve of the fluid control system.
Figure 5:
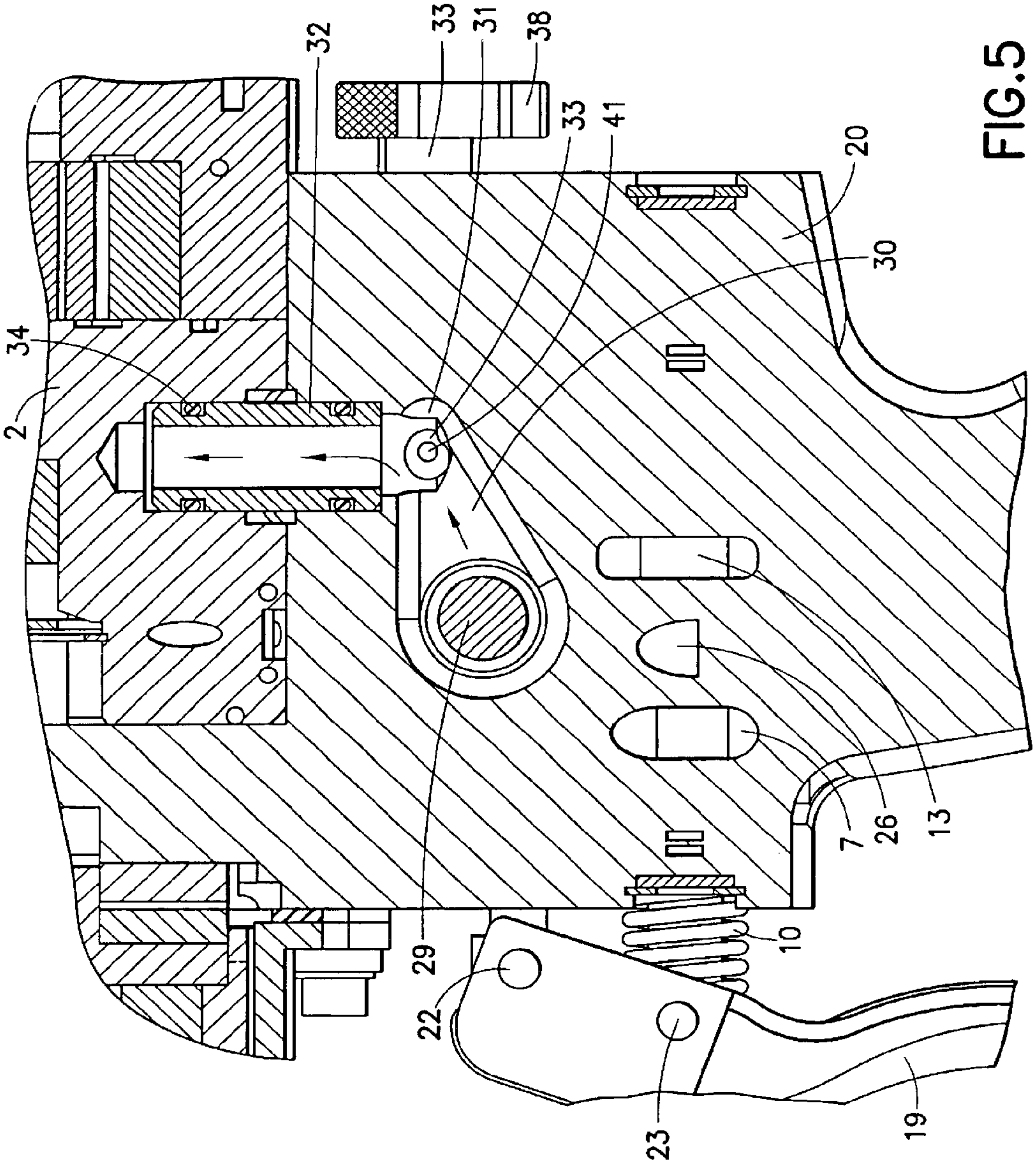
FIG. 5 is a cross sectional view from the side depicting the oil bypass cavity.
Figure 6:
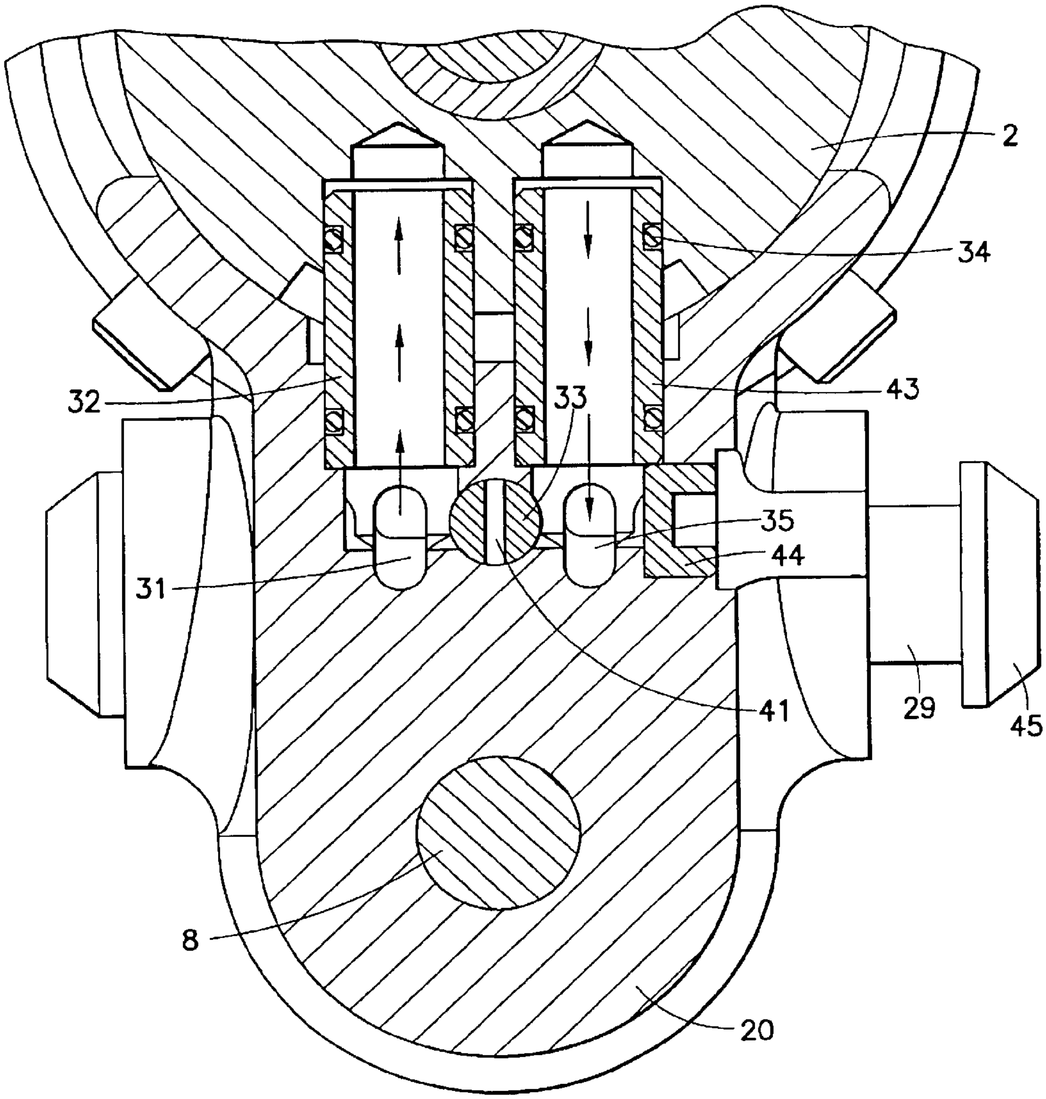
FIG. 6 is a cross sectional view from the front depicting the flow of fluid into the motor.

FIG. 5 provides a lateral view of port 30. In FIG. 5, oil enters the bypass cavity 31. If the position of the bypass spool 33 is in the zero bypass position, as shown in FIG. 2 and FIG. 6, the oil will flow directly into the fluidic tube 32 and then into the motor 2 to perform work. The fluidic tube 32 is hydraulically sealed, preferably by O-rings 34. As seen in FIG. 6 the oil returns from the motor 2 through the fluidic tube 43 into the cavity 35. In preferred embodiments, the oil is prevented from leaking from the tool by an NPT or SAE type plug 44. The oil travels from the cavity 35 into port 36 (shown in FIG. 4). Also in FIG. 4, a case drain 48 in the motor dumps lubricating flow into port 37 for returning flow. The motor reversing spool 29 forces the oil into port 37. The oil then travels through port 37, and, switching back to FIG. 2, into the return cavity 14, then back to the supply by traveling though port 15, around the check ball 16, and through the coupler 18.

Figure 7:
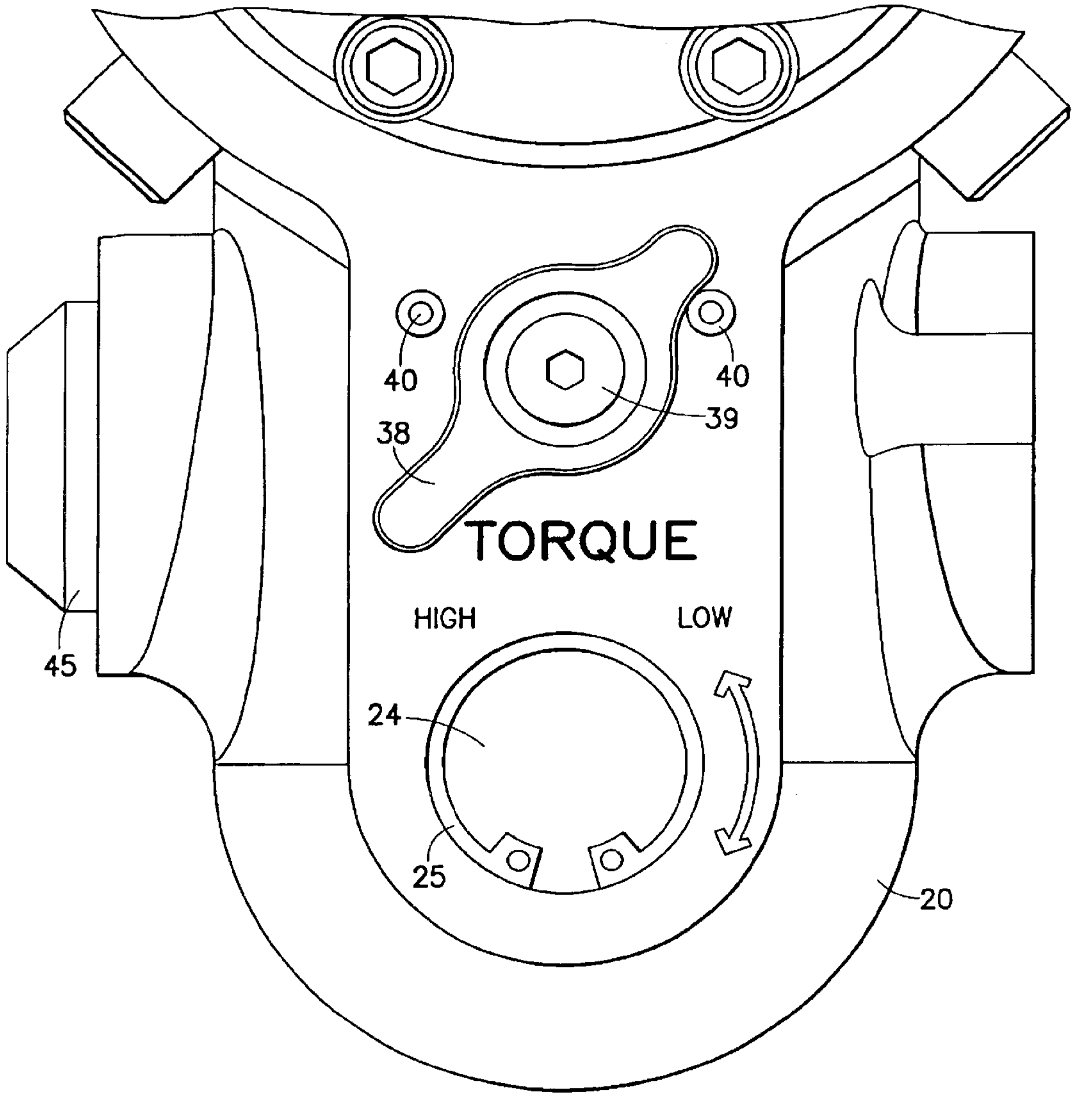
FIG. 7 is a first illustration of the control spool knob.
Figure 8:
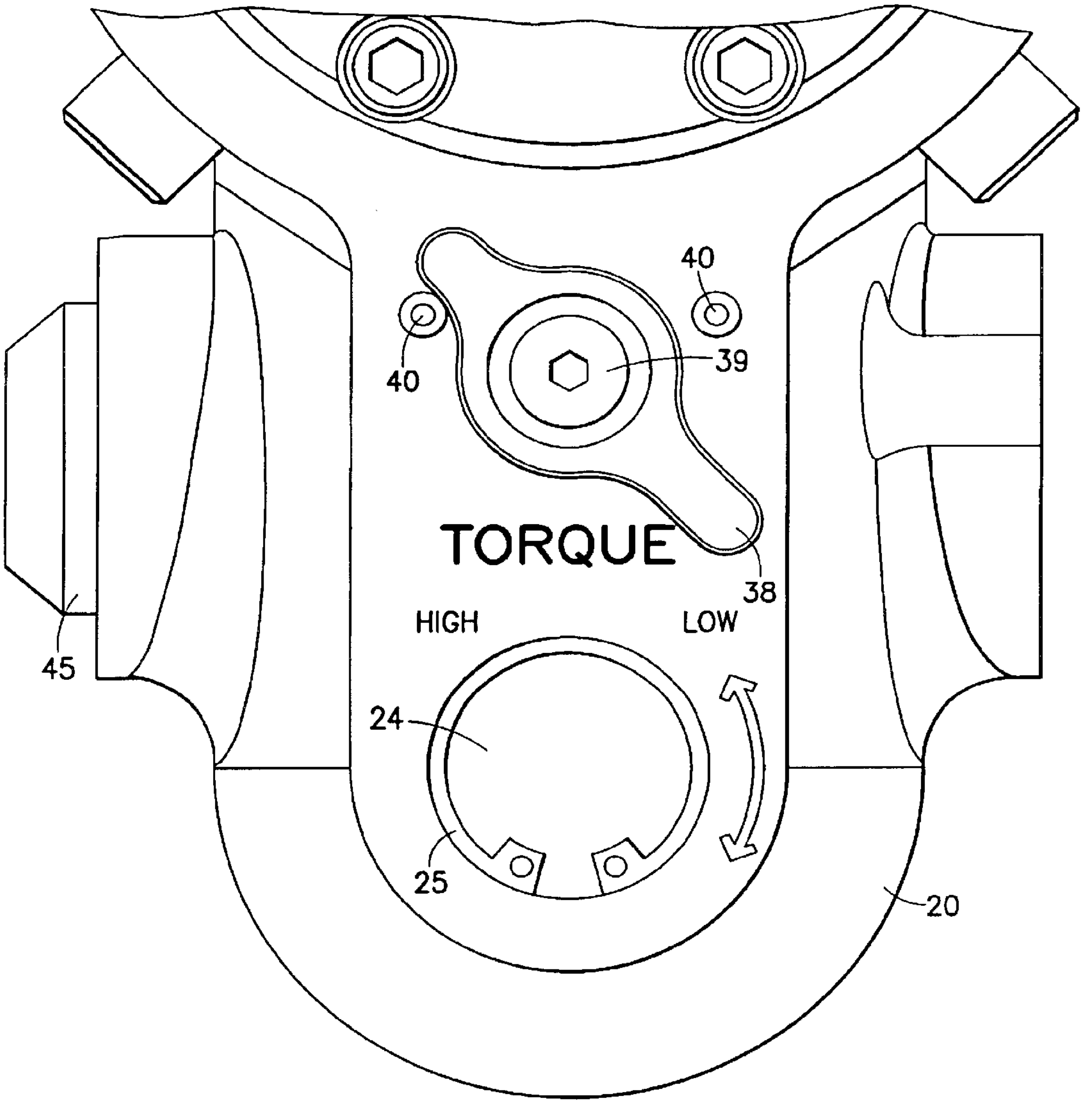
FIG. 8 is a second illustration of the control spool knob.
Figure 9:
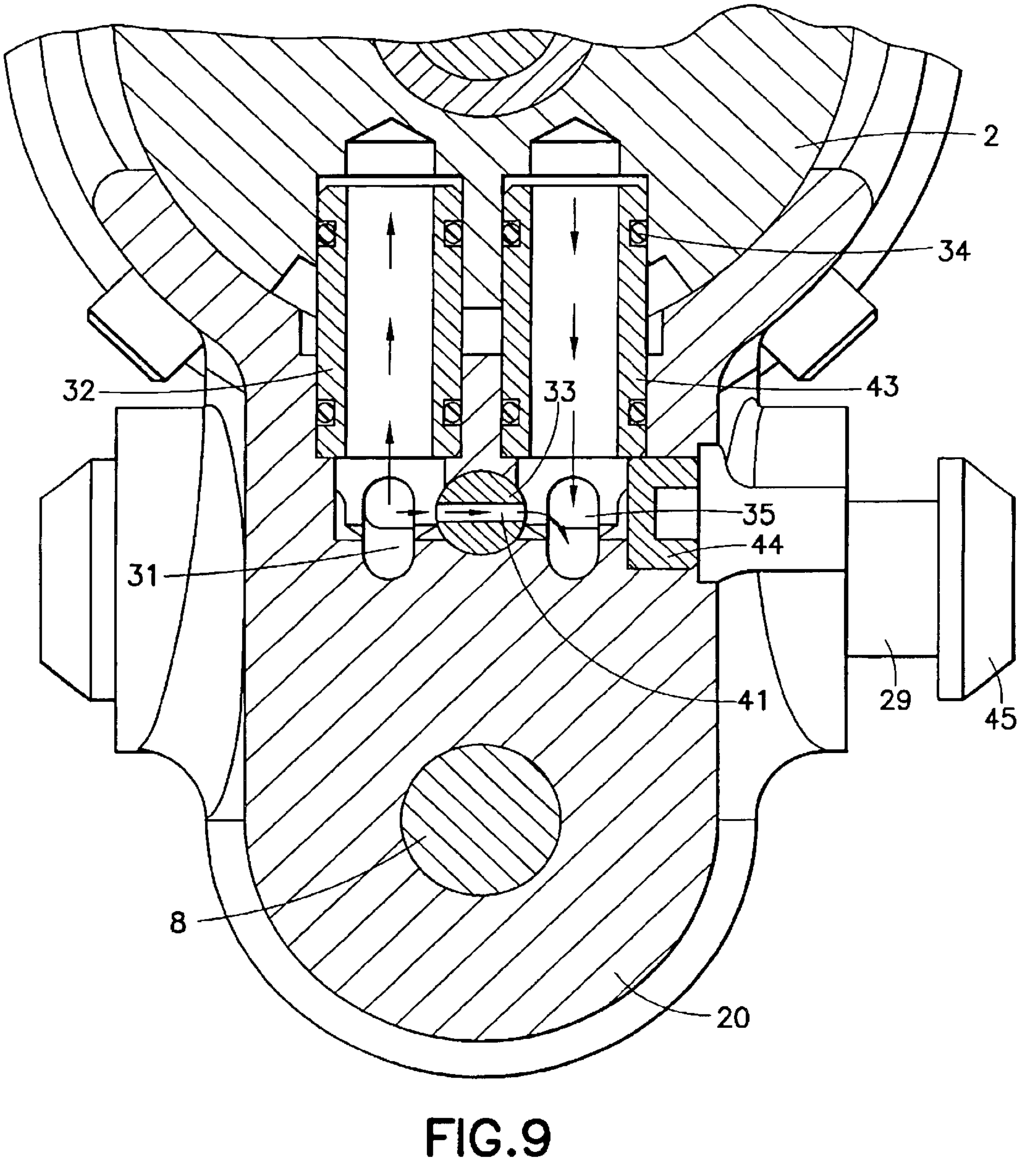
FIG. 9 is a cross sectional view as in FIG. 6 depicting the bypass spool configured for power limiting; and, FIG. 10 is a cross sectional view as in FIG. 4, depicting the motor reversing valve of the fluid control system at a second position.

When full power is not required, the operator can rotate the control spool knob 38 up to ninety degrees, as shown in FIG. 7 and FIG. 8. The knob 38 is preferably fastened to the bypass spool 33 with a screw 39. The rotation of the knob 38 is preferably limited by two dowel pins 40. The rotation of the bypass spool 33 by the rotation of the knob 38 changes the position of an orifice, or bypass hole 41 in the bypass spool 33, as seen in FIG. 9. The bypass 41 allows a portion of the oil to flow from the pressurized port 31 to the return port 35. The maximum flow allowed to bypass is dependant on the cross sectional area of the bypass 41, the shape of the bypass 41, and the angular position of the bypass 41 relative to the vertical. In preferred embodiments, the bypass 41 is sized to permit enough flow to limit power output by roughly fifty percent when the bypass 41 is normal to the vertical, or in full communication with the return port 35. When the bypass 41 is parallel to the vertical (shown in FIG. 6), or in position so as to be sealed from the return port 35, zero percent of power is lost. Thus, in the preferred embodiment, the power output can be varied between about fifty percent and about one hundred percent with the rotation of the bypass spool 33. However, the bypass 41 may be configured to provide for limiting power output between about zero percent and about one hundred percent of full power.

Figure 10:
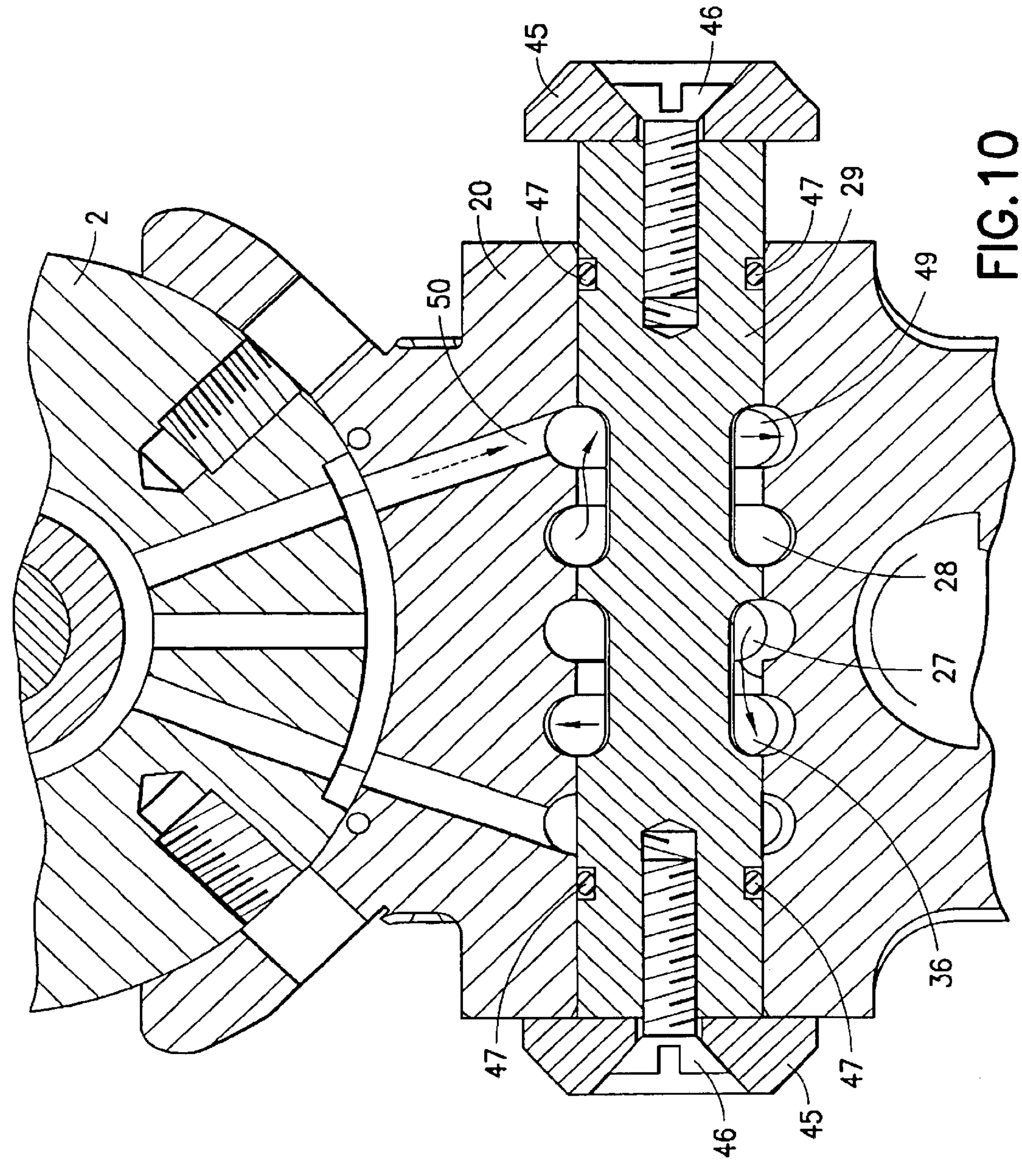

To reverse the direction of the motor 2, the motor reversing spool 29 may be pushed or pulled as appropriate to provide lateral movement thereof, thus redirecting the flow. Referring to FIG. 10, once redirected, the oil reverses the direction of travel through the flow control circuit 1 described in the foregoing. Therefore, in reverse operation, once in the cavity 27, the oil is forced into adjacent cavity 36 by the motor reverse spool 29, as shown in FIG. 4. Regardless of the direction of oil flow, the bypass spool works in the same way. Note that in FIG. 10 many of the features described in FIG. 4 are also shown. These features are not described again for the sake of brevity. Also note that a case drain 50 provides for the return of lubricating flow in reverse operation. Also note that the knobs 45 preferably appear on both sides of the handle 20, although not shown as such in FIG. 4.

In addition to the foregoing aspects of the fluid control system 1 described, it is within the teachings herein to include diversion from the flow of oil at selected locations for other purposes. That is, in addition to the features above, the fluid control system 1 may contain bleeder valves or other features that provide oil supply for such purposes as tool lubrication.

Figures 11, 11A:
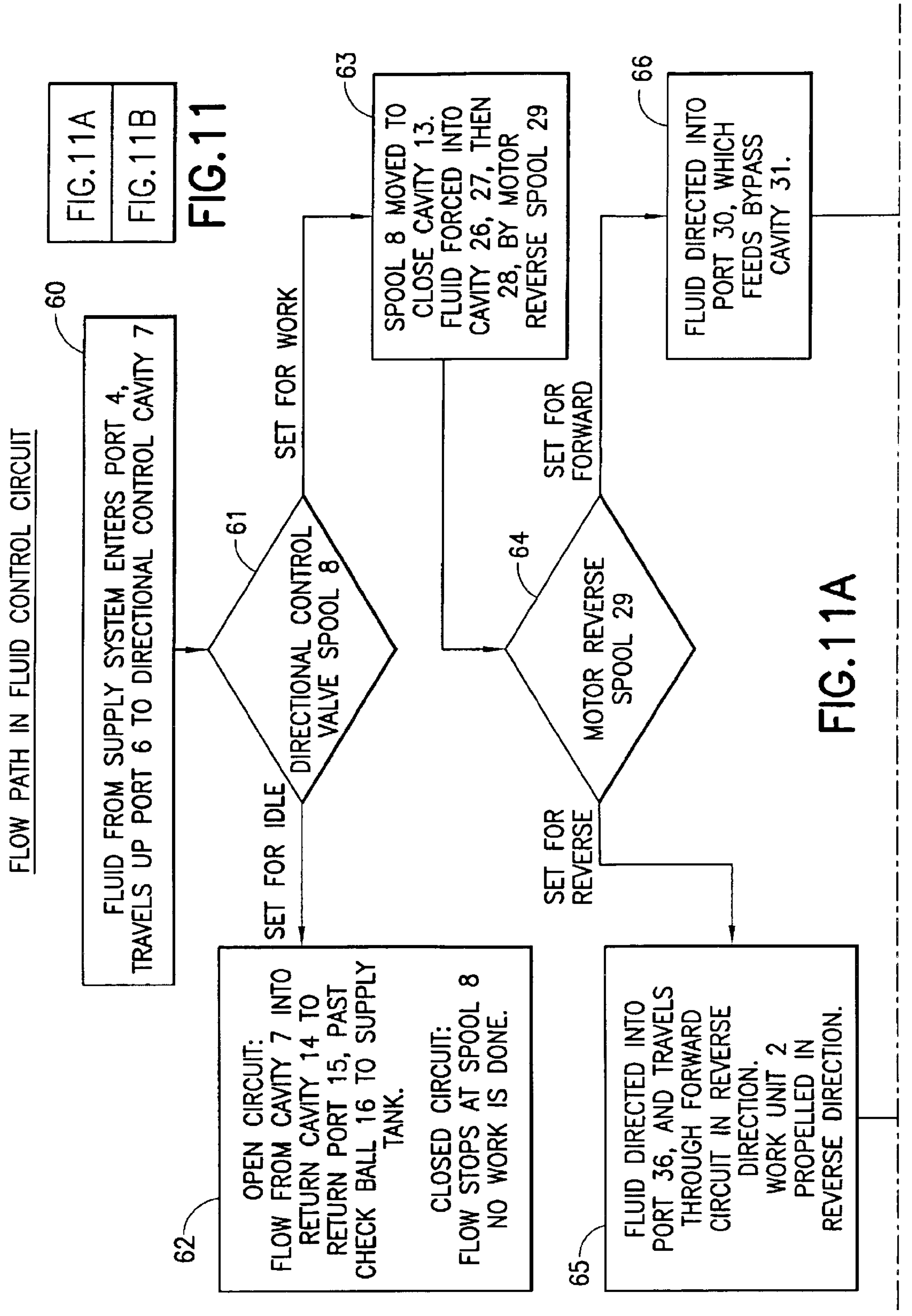
FIG. 11 provides an overview of the flow paths in the fluid control system.
Figure 11B:
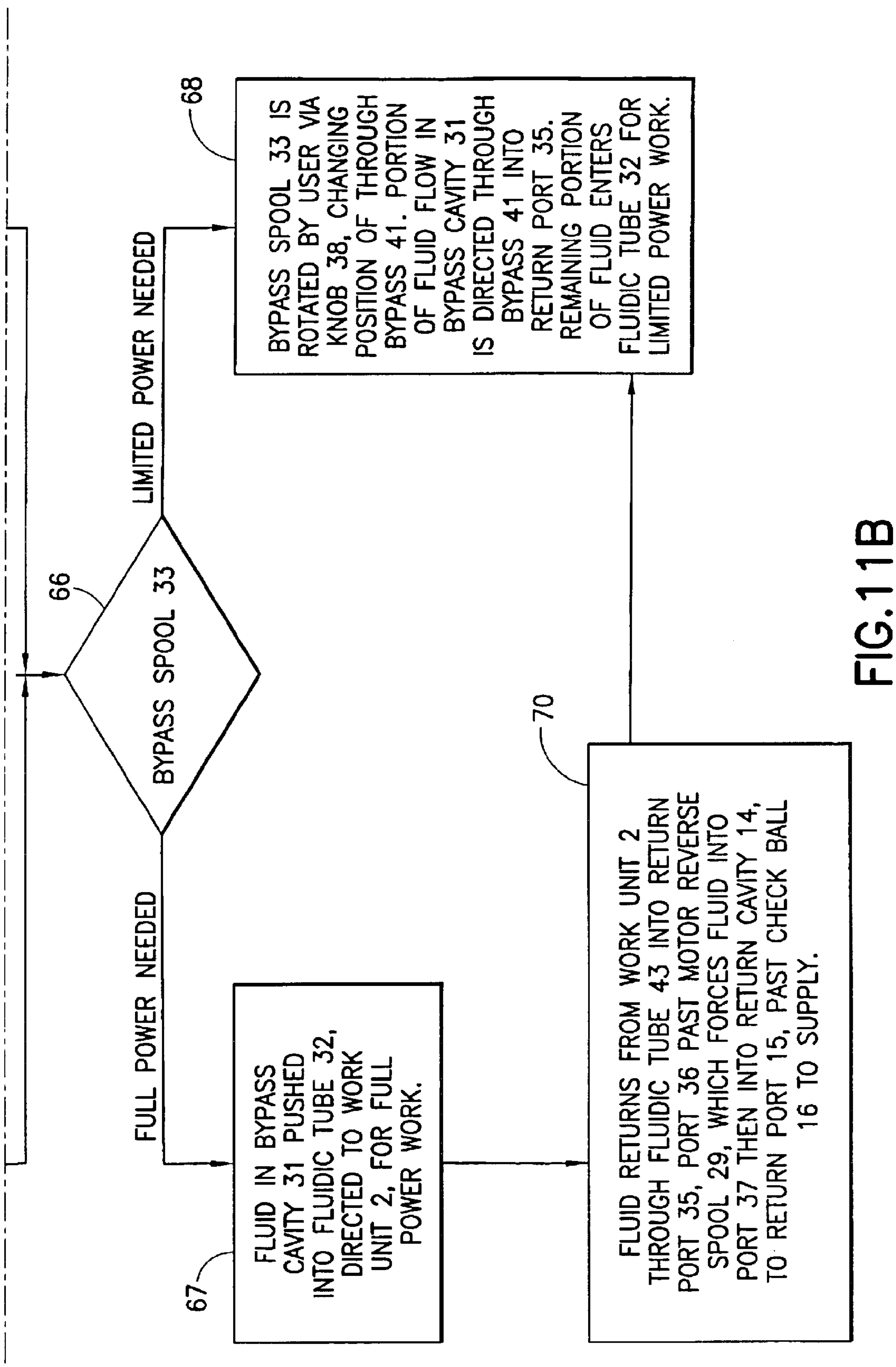

FIG. 11 provides an overview of the flow of fluid in the fluid control circuit disclosed herein. As shown in FIG. 11, operation of the fluid control circuit 1 begins at step 60, wherein a fluid supply provides fluid to the fluid control circuit 1. Next, in step 61, the direction control valve spool 8 is either set for work, or set for idle. In the case 62 where the tool is idle, the directional control valve is set for one of either: routing the fluid back to the supply (in the open circuit mode); or provides a seal wherein flow is stopped (in the closed circuit mode). In the case 63 where the tool is set for work, the trigger 19 is depressed for operation of the tool. The hydraulic fluid flows through various features to the motor reverse spool 29. A shown in step 64, the motor reverse spool 29 directs flow in one of two directions 65, 66 through the fluid control circuit 1. Flow from either direction 65, 66 then reaches the bypass spool 33, 66, which is rotated so the bypass 41 is either: in position so as to permit a portion of flow to go directly into the return port 35; or, closed off from incoming flow, thereby causing all flow to go directly to the work unit 2. In the case 68 where limited power is needed, a portion of the flow enters the bypass 41 and does not reach the work unit 2. Where full power is needed 67, all of the flow is directed to the work unit 2. As shown in step 70, once the fluid exits from the work unit, the fluid is returned to the supply for recycling.

A hydraulically driven tool comprising the fluid control circuit 1 disclosed herein provides for selectably varying the flow of hydraulic fluid to a work unit 2, and therefore the output of the tool. In the embodiment wherein the fluid control circuit 1 is used as a part of a variable torque impact wrench, the wrench can be used effectively for robust drilling jobs, as well as the installation of hardware.

Figure 13:
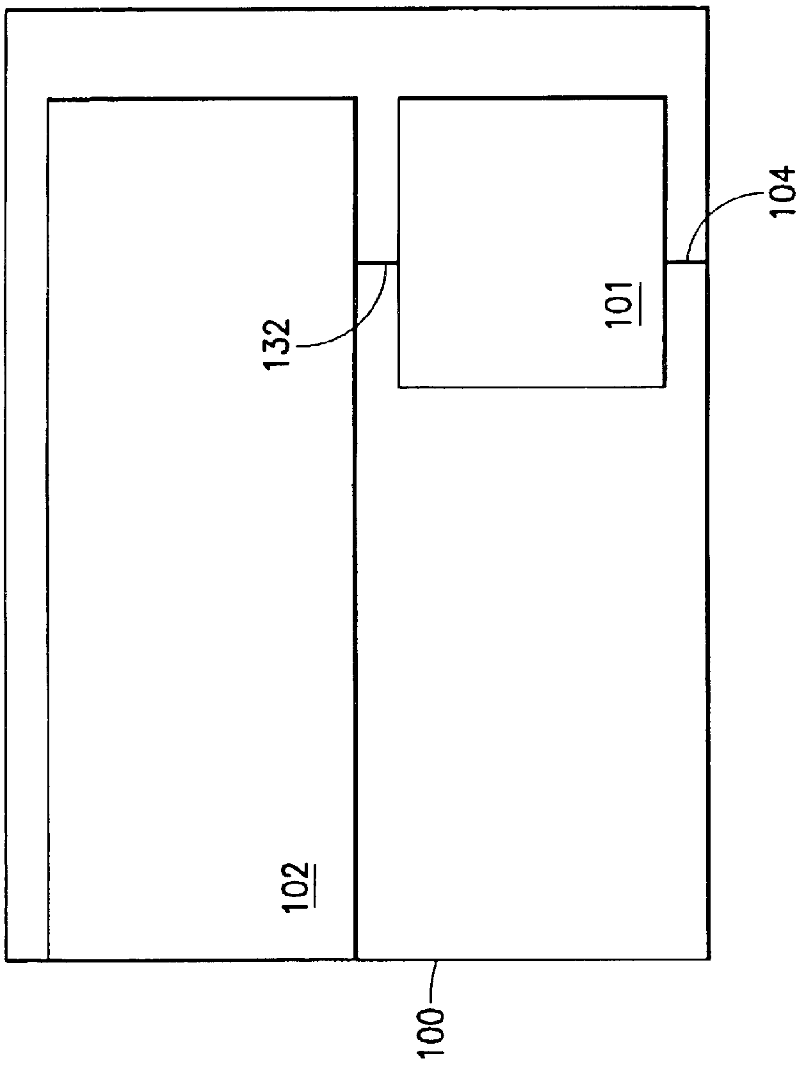
FIG. 13 depicts the fluid control circuit disposed within a tool.

FIG. 13 provides an exemplary embodiment of other tools where teachings herein may be practiced. In FIG. 13, a tool 100 contains a work unit 102 and a fluid control circuit 101. In operation, the fluid control circuit 101 is coupled to a fluid supply (not shown) by connector 104. In the embodiment shown in FIG. 13, the fluid control circuit 101 is used to control flow through at least one fluidic tube 132 to the work unit 102, thus providing for control over the output of the tool 100. Examples of tools 100 that may be constructed according to this embodiment, or variations thereof, include, without limitation: wrenches, grinders and drills.

One skilled in the art will recognize that the invention disclosed herein is not limited to use in a variable torque impact wrench. For example, the fluid control system 1 disclosed herein may be used in wrenches, grinders, drills, chain saws, pole saws, circular saws, pruners, tampers, and other tools having similar power requirements. As another example, features of the present invention could be used in a pneumatic tool rather than a hydraulic tool. Therefore, it is within the teachings contained herein to use this invention, and variations thereof, in other applications.

What is claimed is:

1. A power limiting system for a fluid driven tool, the power limiting system disposed upstream of a work unit and within the tool, the power limiting system comprising:

an inlet port for receiving an inlet flow comprising fluid from a supply;

a direction control valve downstream of the inlet port for controlling the flow to the work unit;

a bypass valve which is disposed downstream of the direction control valve; and a motor reversing valve disposed downstream of the direction control valve and upstream of the bypass valve, wherein the bypass valve comprises a movable bypass member with a valveless conduit, wherein the valveless conduit is adapted for diverting a portion of the inlet flow from entering the work unit directly to a return flow from the work unit, wherein the bypass valve is movable about an axis generally orthogonal to an axis of movement of the motor reversing valve.

2. A power limiting system as in claim 1, wherein the motor reversing valve is adapted for redirecting the inlet flow to a reversing circuit to cause reverse operation of the work unit.

3. A power limiting system as in claim 2, wherein the motor reversing valve is reconfigured by lateral movement thereof.

4. A power limiting system as in claim 1, wherein the movable bypass member diverts the portion of the inlet flow upon rotation of the bypass valve.

5. A power limiting system as in claim 1, wherein the work unit comprises a gerotor motor.

6. A power limiting system as in claim 1, wherein the work unit comprises a gear driven motor.

7. A power limiting system as in claim 1, wherein the portion of the inlet flow is about fifty percent of the inlet flow.

8. A power limiting system as in claim 1, wherein the portion of the inlet flow is about zero percent of inlet flow.

9. A power limiting system as in claim 1, wherein the portion of the inlet flow ranges from about zero percent to about one hundred percent of the inlet flow.

10. A power limiting system as in claim 1, wherein the direction control valve is adapted for operating in the idle state to interrupt the inlet flow to the work unit.

11. A power limiting system as in claim 1, wherein the direction control valve is adapted for operating in the idle state to divert the inlet flow from the work unit.

12. A hydraulically driven tool comprising:

a work unit within the tool for completing work;

a fluid control system disposed within the tool upstream of the work unit, the fluid control system comprising an inlet port for receiving a flow comprising hydraulic fluid from a supply, a direction control valve downstream of the inlet port for controlling the flow to the work unit, a bypass valve which is disposed downstream of the direction control valve, and a motor reversing valve disposed downstream of the direction control valve and upstream of the bypass valve, wherein the bypass valve comprises a bypass adapted for diverting a portion of the flow from entering the work unit, wherein the bypass valve is movable about an axis generally orthogonal to an axis of movement of the motor reversing valve; and, an outlet for returning the hydraulic fluid to the supply.

13. A hydraulically driven tool as in claim 12, wherein the tool comprises a variable torque impact wrench.

14. A hydraulically driven tool as in claim 12, wherein the tool comprises a wrench.

15. A hydraulically driven tool as in claim 12, wherein the tool comprises a grinder.

16. A hydraulically driven tool as in claim 12, wherein the tool comprises a drill.

17. A hydraulically driven tool comprising:

a work unit comprising a gerotor motor;

a fluid control system operably coupled to the work unit, the fluid control system comprising an inlet port for receiving a flow comprising hydraulic fluid from a supply, a direction control valve downstream of the inlet port for controlling the flow to the work unit, a bypass valve which is disposed downstream of the direction control valve, and a motor reversing valve disposed downstream of the direction control valve, wherein the bypass valve comprises a rotatable valveless bypass member having a bypass hole adapted for diverting a portion of the flow from entering the work unit directly into a return flow from the work unit, wherein the bypass valve is movable about an axis generally orthogonal to an axis of movement of the motor reversing valve; and an outlet for returning the hydraulic fluid to the supply.

* * * * *